(12) United States Patent
Lum

(10) Patent No.: US 7,984,195 B2
(45) Date of Patent: Jul. 19, 2011

(54) HYBRID INDUSTRIAL NETWORKED COMPUTER SYSTEM

(75) Inventor: Jackson Lum, Roslyn, NY (US)

(73) Assignee: Logic Controls, Inc., New Hyde Park, NY (US)

( * ) Notice: Subject to any disclaimer, the term of this patent is extended or adjusted under 35 U.S.C. 154(b) by 667 days.

(21) Appl. No.: 11/827,101

(22) Filed: Jul. 9, 2007

(65) Prior Publication Data

US 2008/0022017 A1    Jan. 24, 2008

Related U.S. Application Data

(60) Provisional application No. 60/819,175, filed on Jul. 7, 2006.

(51) Int. Cl.
*G06F 15/16* (2006.01)
*G06F 17/00* (2006.01)
*G06Q 10/00* (2006.01)
*G06Q 30/00* (2006.01)
*G05B 15/00* (2006.01)

(52) U.S. Cl. ......... 709/252; 709/200; 709/203; 705/1.1; 705/14.38; 700/1; 700/90

(58) Field of Classification Search .......... 709/200–201, 709/203–205, 223, 252; 705/1.1, 14.38; 700/1, 90
See application file for complete search history.

(56) References Cited

U.S. PATENT DOCUMENTS

| 3,898,373 A | 8/1975 | Walsh |
|---|---|---|
| T948,012 I4 | 7/1976 | Bouknecht et al. |
| 4,181,936 A | 1/1980 | Kober |
| 4,304,001 A | 12/1981 | Cope |
| 4,314,334 A | 2/1982 | Daughton et al. |
| 4,387,425 A | 6/1983 | El-Gohary |
| 4,443,866 A | 4/1984 | Burgiss, Sr. |
| 4,484,273 A | 11/1984 | Stiffler et al. |
| 4,516,201 A | 5/1985 | Warren et al. |
| 4,547,850 A | 10/1985 | Genma |
| 4,592,012 A | 5/1986 | Braun |
| 4,626,844 A | 12/1986 | Mann et al. |
| 4,641,266 A | 2/1987 | Walsh |
| 4,688,171 A | 8/1987 | Selim et al. |
| 4,742,484 A | 5/1988 | Yanai et al. |

(Continued)

OTHER PUBLICATIONS

"QSR Automations Ethernet Kitchen Solution for the Food Service Industry", QSR Automations, Inc., pp. 1-2, © 2002.

(Continued)

*Primary Examiner* — Joshua Joo
(74) *Attorney, Agent, or Firm* — Hoffmann & Baron, LLP

(57) ABSTRACT

A Point-of-Sale networked computing system includes a workstation with a first Personal Computer (PC)-based controller, a workstation with a second industrial PC-based controller having different performance characteristics than the first controller, and an Ethernet network coupling the workstations. The Ethernet network may include home-run or star Ethernet topology, and the controllers may be TCP/IP addressable. The computing system may be used in a restaurant, kitchen, shop, or department store. The computing system may also include a bump bar keyboard or keypad and a monitor coupled to the controllers Another Point-of-Sale networked computing system includes at least two workstations, each of which includes an industrial non-PC-based controller, and an Ethernet network coupling the workstations. Yet Another Point-of-Sale networked computing system includes a workstation with an industrial PC-based controller, a workstation with an industrial non-PC-based controller, and an Ethernet network coupling the workstations.

16 Claims, 6 Drawing Sheets

U.S. PATENT DOCUMENTS

| | | | |
|---|---|---|---|
| 4,817,037 A | 3/1989 | Hoffman et al. |
| 4,852,043 A | 7/1989 | Guest |
| 4,855,908 A | 8/1989 | Shimoda et al. |
| 4,862,353 A | 8/1989 | Williams |
| 4,935,720 A | 6/1990 | Kalfoun |
| 4,949,299 A | 8/1990 | Pickett |
| 4,972,463 A | 11/1990 | Danielson et al. |
| 5,018,066 A | 5/1991 | Yagi |
| 5,119,294 A | 6/1992 | Tanaka |
| 5,128,862 A | 7/1992 | Mueller |
| 5,165,024 A | 11/1992 | Sweazey |
| 5,179,375 A | 1/1993 | Dick et al. |
| 5,218,527 A | 6/1993 | Ishikawa et al. |
| 5,235,509 A | 8/1993 | Mueller et al. |
| 5,294,994 A | 3/1994 | Robinson et al. |
| 5,313,664 A | 5/1994 | Sugiyama et al. |
| D349,277 S | 8/1994 | Merino et al. |
| 5,349,823 A | 9/1994 | Solomon |
| 5,371,859 A | 12/1994 | Lennartsson |
| 5,410,650 A | 4/1995 | Sasaki et al. |
| 5,438,607 A | 8/1995 | Przygoda, Jr. et al. |
| 5,444,847 A | 8/1995 | Iitsuka |
| 5,446,846 A | 8/1995 | Lennartsson |
| 5,510,979 A | 4/1996 | Moderi et al. |
| 5,528,758 A | 6/1996 | Yeh |
| 5,535,336 A | 7/1996 | Smith et al. |
| 5,615,380 A | 3/1997 | Hyatt |
| 5,644,700 A | 7/1997 | Dickson et al. |
| 5,687,393 A | 11/1997 | Brown et al. |
| 5,694,124 A | 12/1997 | Wood |
| 5,721,737 A | 2/1998 | Radjabi et al. |
| 5,752,049 A | 5/1998 | Lee |
| 5,760,690 A | 6/1998 | French |
| 5,804,875 A | 9/1998 | Remsburg et al. |
| 5,832,244 A | 11/1998 | Jolley et al. |
| 5,895,452 A | 4/1999 | Lum |
| 5,905,908 A | 5/1999 | Wagner |
| 5,956,523 A | 9/1999 | Chen |
| 5,960,212 A | 9/1999 | Mak |
| 5,987,426 A | 11/1999 | Goodwin, III |
| 6,067,527 A | 5/2000 | Lovell et al. |
| 6,073,201 A | 6/2000 | Jolley et al. |
| D428,411 S | 7/2000 | Poole et al. |
| D428,881 S | 8/2000 | Poole et al. |
| 6,137,591 A | 10/2000 | Kikinis |
| 6,161,159 A | 12/2000 | Suzuki |
| 6,271,604 B1 | 8/2001 | Frank, Jr. et al. |
| 6,272,529 B1 | 8/2001 | Lum |
| 6,292,201 B1 | 9/2001 | Chen et al. |
| 6,297,955 B1 | 10/2001 | Frank, Jr. et al. |
| 6,359,779 B1 | 3/2002 | Frank, Jr. et al. |
| 6,369,824 B1 | 4/2002 | Lee |
| 6,389,499 B1 | 5/2002 | Frank, Jr. et al. |
| 6,401,159 B1 | 6/2002 | Wang |
| 6,411,522 B1 | 6/2002 | Frank, Jr. et al. |
| 6,496,892 B1 | 12/2002 | Lake et al. |
| 6,501,999 B1 | 12/2002 | Cai |
| D471,191 S | 3/2003 | Yu et al. |
| 6,644,547 B1 * | 11/2003 | White ............ 235/381 |
| 6,671,763 B1 | 12/2003 | Korowitz et al. |
| 6,834,321 B2 | 12/2004 | Yokoyama |
| 6,845,363 B1 | 1/2005 | Matsubara et al. |
| 6,879,962 B1 * | 4/2005 | Smith et al. ............ 705/22 |
| 6,940,868 B1 | 9/2005 | Barbour et al. |
| 7,203,728 B2 | 4/2007 | Lum |
| 7,433,185 B1 * | 10/2008 | Curran et al. ............ 361/679.41 |
| 7,761,621 B2 * | 7/2010 | Hutchison et al. ............ 710/62 |
| 2002/0039286 A1 | 4/2002 | Frank, Jr. et al. |
| 2002/0052790 A1 * | 5/2002 | Tomishima ............ 705/15 |
| 2002/0156683 A1 * | 10/2002 | Stoutenburg et al. ............ 705/16 |
| 2003/0177207 A1 * | 9/2003 | Nagasaka et al. ............ 709/220 |
| 2004/0158494 A1 * | 8/2004 | Suthar ............ 705/15 |
| 2005/0021407 A1 * | 1/2005 | Kargman ............ 705/15 |
| 2005/0021409 A1 * | 1/2005 | Michaud et al. ............ 705/16 |
| 2005/0060444 A1 * | 3/2005 | Lum ............ 710/36 |
| 2005/0209963 A1 * | 9/2005 | Momose ............ 705/39 |
| 2005/0217300 A1 * | 10/2005 | Cheng et al. ............ 62/259.2 |
| 2005/0273345 A1 * | 12/2005 | Castillejo Romero ............ 705/1 |
| 2006/0064524 A1 | 3/2006 | Lum |
| 2006/0277338 A1 | 12/2006 | Lum |
| 2007/0265935 A1 * | 11/2007 | Woycik et al. ............ 705/26 |

OTHER PUBLICATIONS

"QSR Automations Kitchen Display System Product Overview", Verison 5.1, Nov. 21, 2002, QSR Automations, Inc. © 1996-2001.

"eXpertONE Hospitality System", QSR Automations, Inc. © 2006.

* cited by examiner

HYBRID INDUSTRIAL NETWORKED COMPUTER SYSTEM

CROSS REFERENCE TO RELATED APPLICATION

This application claims the benefit of U.S. Provisional Application No. 60/819,175, filed Jul. 7, 2006, the disclosure of which is incorporated herein by reference.

BACKGROUND OF THE INVENTION

1. Field of the Invention

The present invention generally relates to networked computing systems. In particular, the present invention is directed to networked computing system adapted to be used in industrial applications, such as shops, department stores, kitchens, and the like.

2. Description of the Prior Art

In many industrial automation systems, common requirements include:
1. high reliability;
2. functionality;
3. low cost;
4. endurance in harsh environments;
5. conformity to industry standards in interface protocol and network topology; and
6. small physical size and rugged housing.

For example, one application with the above demanding specifications is a Kitchen Display System (KDS), which is used in restaurants. KDS offers many intelligent features and functionality that improve the productivity of restaurant operations. KDS must be reliable because during busy rush hours, an equipment failure in such systems is not acceptable, no matter how infrequently such failures may occur.

Typical industrial networked computing systems include microcontroller-based workstations networked using RS-485 or RS-232 interface standards with an additional control unit. More customized systems incorporate microprocessor-based workstations that are networked using Ethernet interface standards. However, neither of these approaches when taken alone, is completely successful in meeting the needs of the industry.

For example, in some applications, the performance and cost of microprocessor-based workstations may be unnecessary, and yet an Ethernet topology would be desirable to interface with existing hardware. In other network settings, a particular industrial application might require the advanced performance and capabilities of a microprocessor-based workstation at only some of its sites.

SUMMARY OF THE INVENTION

A Point-of-Sale networked computing system is provided in accordance with the present invention, which includes a workstation including a first Personal Computer (PC)-based controller, a workstation including a second industrial PC-based controller with different performance characteristics than the first industrial controller, and an Ethernet network operatively coupling the workstations. The Ethernet network may include a home-run or star Ethernet topology, and at least one of the industrial controllers may be adapted to be TCP/IP addressable. The computing system may be adapted for use in a restaurant, kitchen, shop, or store. The computing system may also include a bump bar keyboard or keypad and a monitor operatively coupled to at least one of the industrial controllers.

A Point-of-Sale networked computing system is further provided in accordance with the present invention, which includes at least two workstations, each of which includes an industrial non-PC-based controller, and an Ethernet network operatively coupling the workstations.

A Point-of-Sale networked computing system is yet further provided in accordance with the present invention, which includes a workstation including an industrial PC-based controller, a workstation including an industrial non-PC-based controller, and an Ethernet network operatively coupling the workstations.

These and other objects, features, and advantages of this invention will become apparent from the following detailed description of illustrative embodiments thereof, which is to be read in connection with the accompanying drawings.

DETAILED DESCRIPTION OF THE PREFERRED EMBODIMENTS

Figure 1:
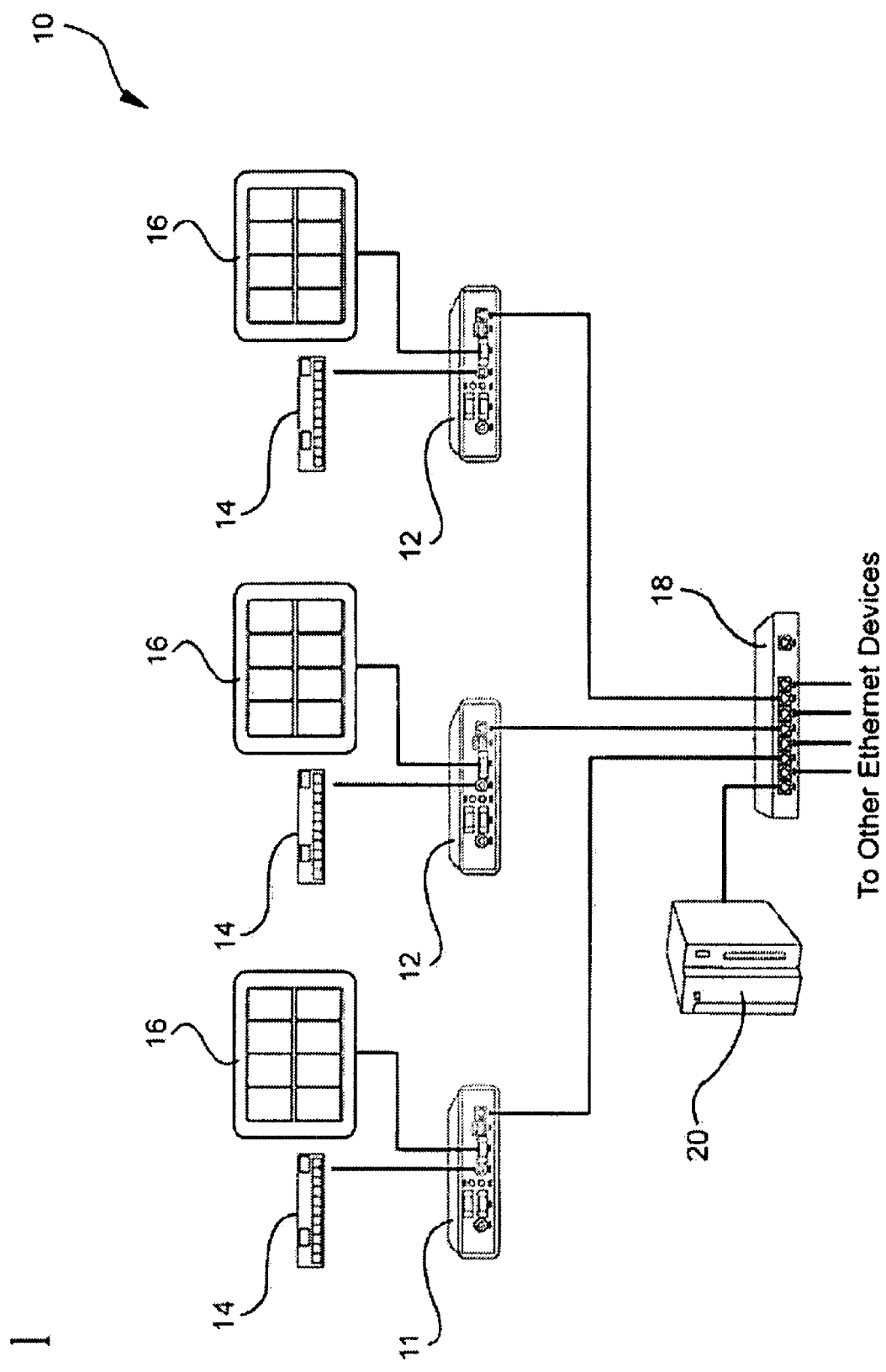
FIG. 1 is a block diagram of an industrial PC-based networked computing system in accordance with the present invention formed in accordance with the present invention.

Kitchen Display Systems (KDS) can be categorized into two groups: industrial Personal Computer (PC)-based workstations and industrial non-PC-based workstations. In the industrial PC-based workstation group, a workstation 10 is shown in FIG. 1, which includes an industrial PC-based controller 12, a bump bar keyboard or keypad 14, a VGA monitor 16, and possibly a printer (not shown). A typical network topology used for the industrial PC-based workstation is also shown in FIG. 1. Each workstation is wired to a system Ethernet hub 18, which is connected to a system server 20, in which the application software resides. Thus, the typical PC-based controller includes a microprocessor with its chipset, which is capable of running operating systems and advanced multimedia applications.

The disadvantages of this system include:
1. Expensive—the general purpose PC 12 provides far more performance than is required by most applications, and can perform many advanced tasks that are not required in KDS applications.
2. Compromised reliability—the PC is a general-purpose piece of complicated equipment, which typically provides numerous sources of failure.
3. Environmental concerns—almost all PCs have a built-in fan for cooling, which are prone to getting fouled in a greasy kitchen environment.
4. Size—standard PCs are generally too large to fit into the limited space of a kitchen.

Figure 2:
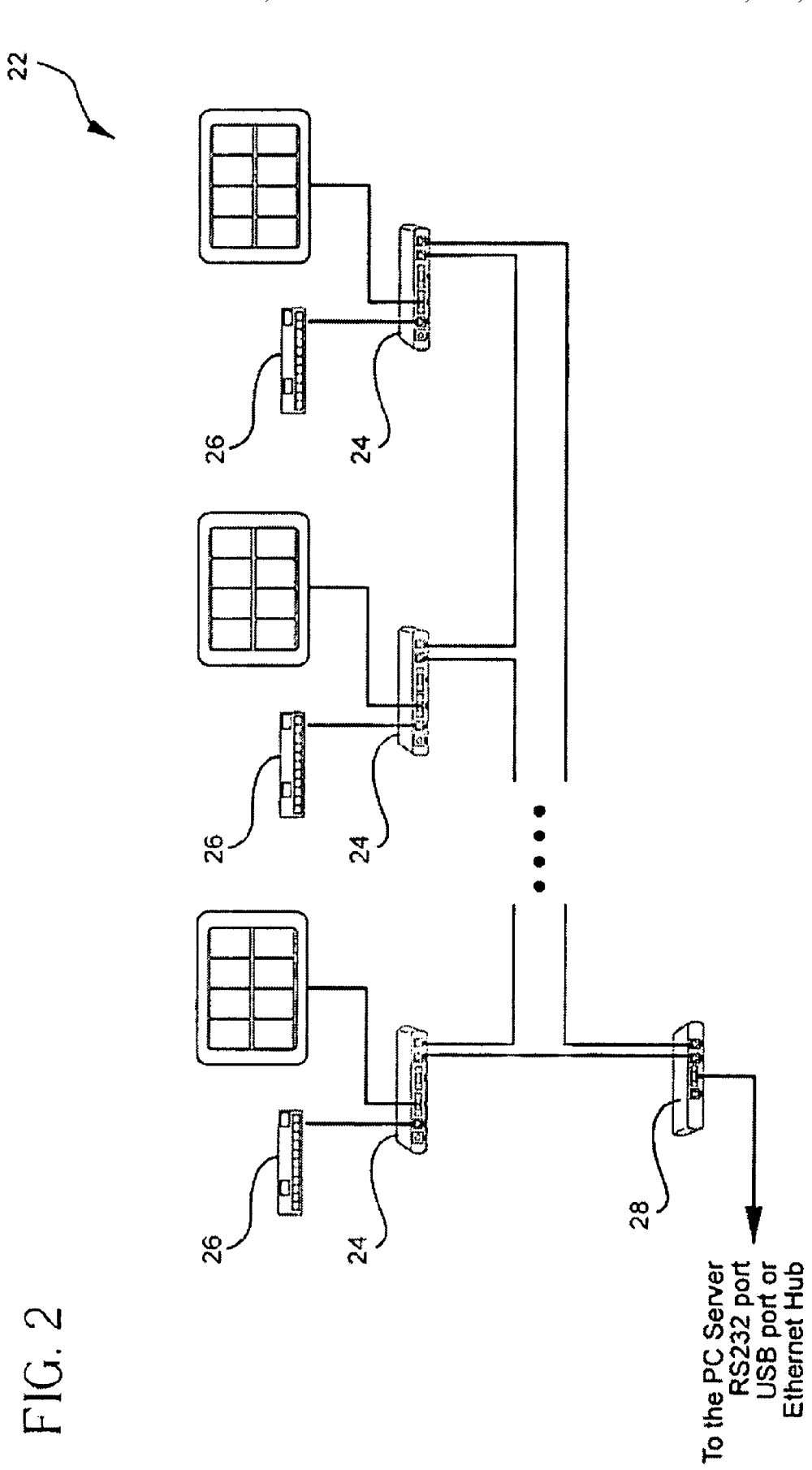
FIG. 2 is a block diagram of an industrial non-PC-based networked computing system.

In the industrial non-PC workstation group, a typical workstation 22 is shown in FIG. 2, which includes a non-PC-based Input/Output (I/O) unit or controller 24 that is much smaller that a typical PC, a bump bar keyboard or keypad 26, a VGA monitor, and possibly a printer (not shown). The whole system may require a special master control unit 28. A typical network topology for the industrial non-PC-based workstation is also shown in FIG. 2. Each workstation is typically wired to a multi-drop loop or a daisy-chain loop that conforms to the RS-485 standard. As shown in FIG. 2, the control unit 28 relays workstation data to an RS-232 port or USB port of a system server 28, or through a system Ethernet hub (not shown) to the system server 28. Thus, the typical non-PC-based controller includes a much less powerful microcontroller that is more customized for specific applications than that of a PC-based controller.

The disadvantages of this system include:
1. an unfamiliar network topology; that is, installers and service technicians are more familiar with Ethernet topology;
2. a lack of multimedia capability, such as an inability to display high-resolution video; and
3. a master control unit 28 that requires substantial additional hardware overhead, that is, the master control unit 28, which is an extra piece of equipment that is normally not required in industrial PC-based systems.

Additional information concerning industrial non-PC workstation systems and related matters is provided in application Ser. Nos. 10/714,592, filed Nov. 14, 2003 entitled "Point-of-Sale System and Distributed Computer Network for Same"; 11/244,313, filed Oct. 5, 2005 entitled "Rugged Industrial Computer Module"; and 11/431,378, filed May 10, 2006 entitled "Rugged Computer Module", which are incorporated herein by reference.

Figure 3:
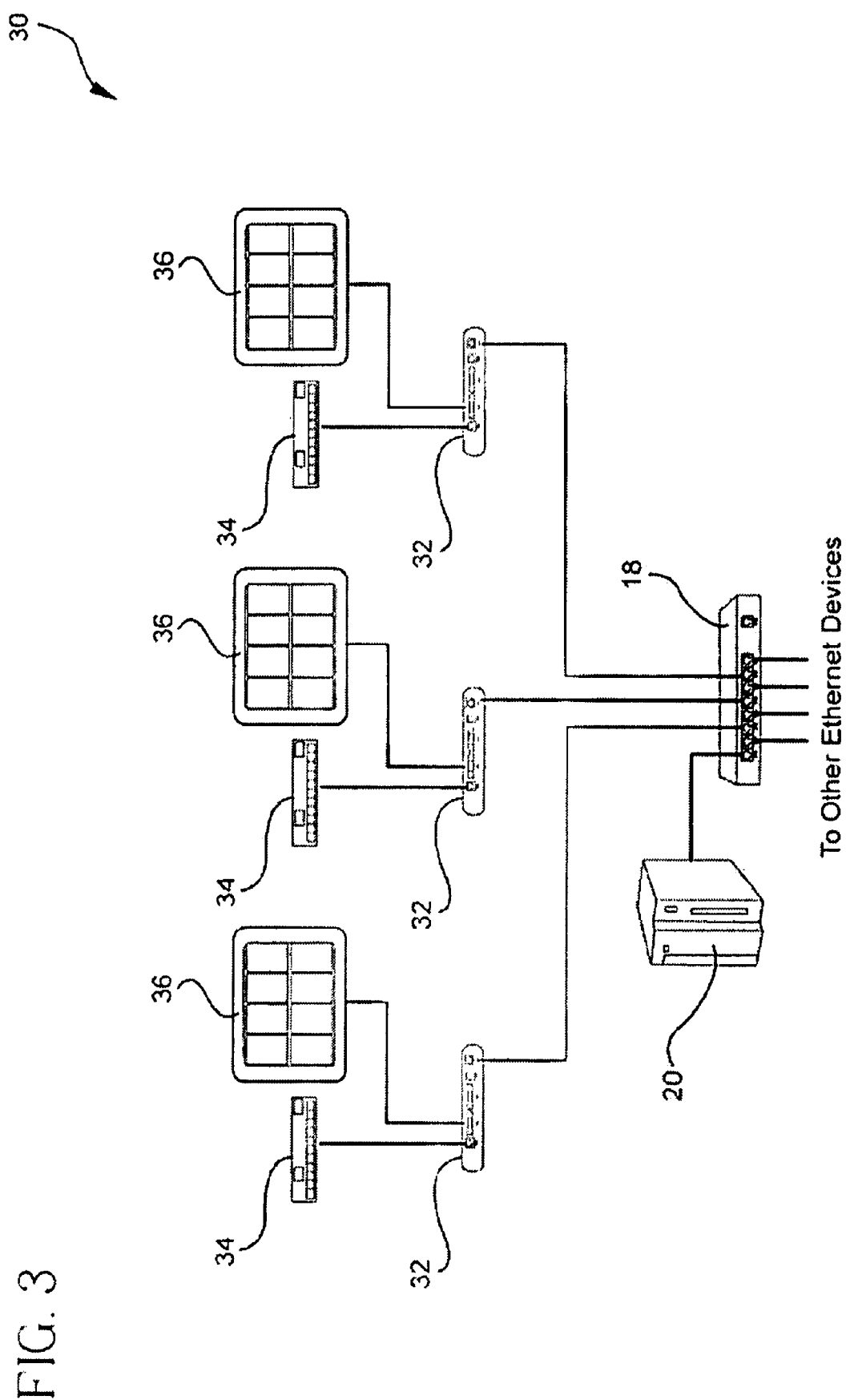
FIG. 3 is a block diagram of an industrial non-PC-based networked computing system in accordance with the present invention.

A networked computing system formed in accordance with the present invention is not limited to exclusive use as a Kitchen Display System (KDS), but may be used in any industrial application, such as but not limited to department stores, kitchens, shops, and other Point-of-Sale (POS) applications, and offers most of the advantages while overcoming the disadvantages in the aforementioned industrial PC-based and industrial non-PC-based systems. As shown in FIG. 3, the system 30 essentially belongs to the industrial non-PC-based system group, but its network topology follows the popular PC-based system.

A typical workstation includes a non-PC-based I/O unit or controller 32, a bump bar keyboard or keypad 34, a VGA monitor 36, and possibly a printer (not shown). Each I/O unit 32, which is labeled "LS6000" in FIG. 3, is preferably wired to a system Ethernet hub 38 connected to a system server 40, in which the application software resides. Because each LS6000 is not a PC, the aforementioned disadvantages in the PC-based system are eliminated. Further, each LS6000 preferably incorporates a built-in Ethernet controller to allow straightforward connectivity to the network and avoid the need for the extra master control unit 28 shown in FIG. 2.

Figure 4A:
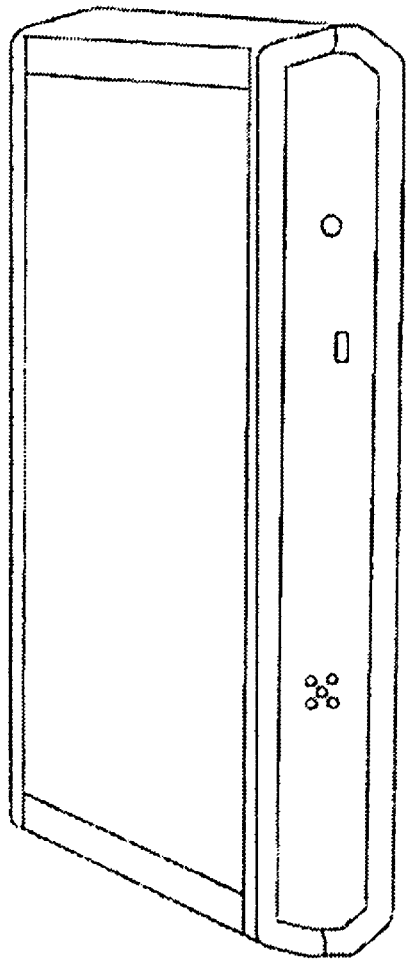
FIGS. 4A and 4B are front and rear pictorial views, respectively, of an industrial non-PC-based control unit in accordance with the present invention.
Figure 4B:
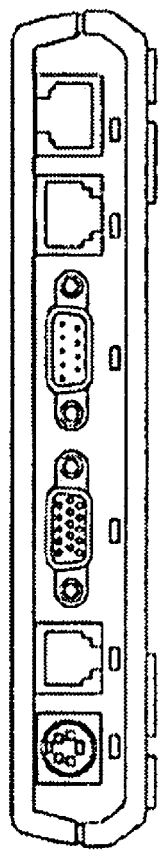
Figure 5:
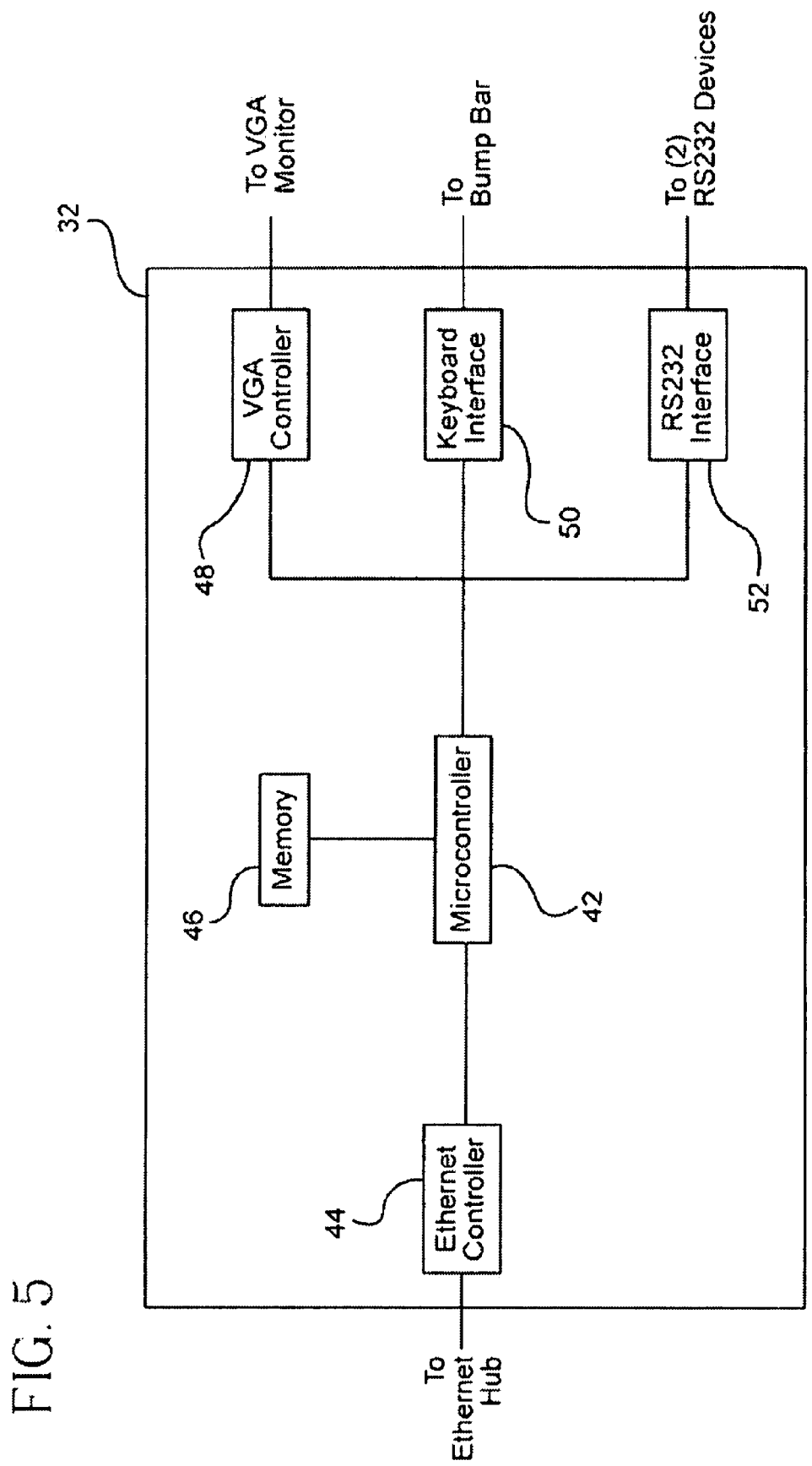
FIG. 5 is a block diagram of the industrial non-PC-based control unit shown in FIGS. 4A and 4B.

FIGS. 4A and 4B are pictorial views of the front and rear of the LS6000 unit, respectively. FIG. 5 shows a block diagram of the LS6000 which includes a microcontroller 42 (which preferably does not include an embedded microprocessor that is typically used in PC-based controllers) operatively coupled to an Ethernet controller 44, memory 46 (which can include dynamic random access memory (DRAM), erasable programmable read only memory (EPROM), read only memory (ROM), and/or any type of memory known in the art), VGA controller 48, keyboard interface 50, and RS-232 interface 52. As shown in FIG. 3, the LS6000 is preferably connected to the Ethernet Hub 38 by a wireless network, but can also be networked with additional LS6000s and the servers 40 wirelessly or by any other means in the art while remaining within the scope of the present invention.

Despite the fast return on an initial investment, the equipment purchase price for industrial applications, such as restaurants, must be competitively low. Because a Kitchen Display System (KDS) typically operates in a hot and greasy kitchen environment, the equipment must be capable of withstanding a high operating temperature. Further, fanless operation is useful to avoid clogging by grease. To install and maintain such equipment, technicians should be able to understand operation of the equipment with a minimum of training. In most restaurant facilities, space is a very limited resource. Therefore, the physical size of the equipment and its ruggedness are desirable features.

Thus, in modern restaurant kitchen display systems (KDS), customers typically require many demanding features. These features include:
1. high reliability;
2. low cost;
3. the ability to operate in hot, greasy, and high humidity environments;
4. small physical size;
5. flexible mounting options;
6. fanless operation;
7. built-in self diagnostics;
8. Ethernet topology with IP addressable workstations;
9. built-in build cards; and
10. the ability to run high-resolution video for training purposes.

Features 1 through 7 are satisfied by the controller 24 in the industrial non-PC-based system shown in FIG. 2. The enhanced controller 32 (LS6000) shown in FIG. 3 satisfies features 1 through 9. Unfortunately, controllers 24, 32 cannot run high-resolution video or other multimedia applications for training, which requires a higher-performance PC. Further, feature 10 is typically not compatible with features 1 and 2, which are also important.

Figure 6:
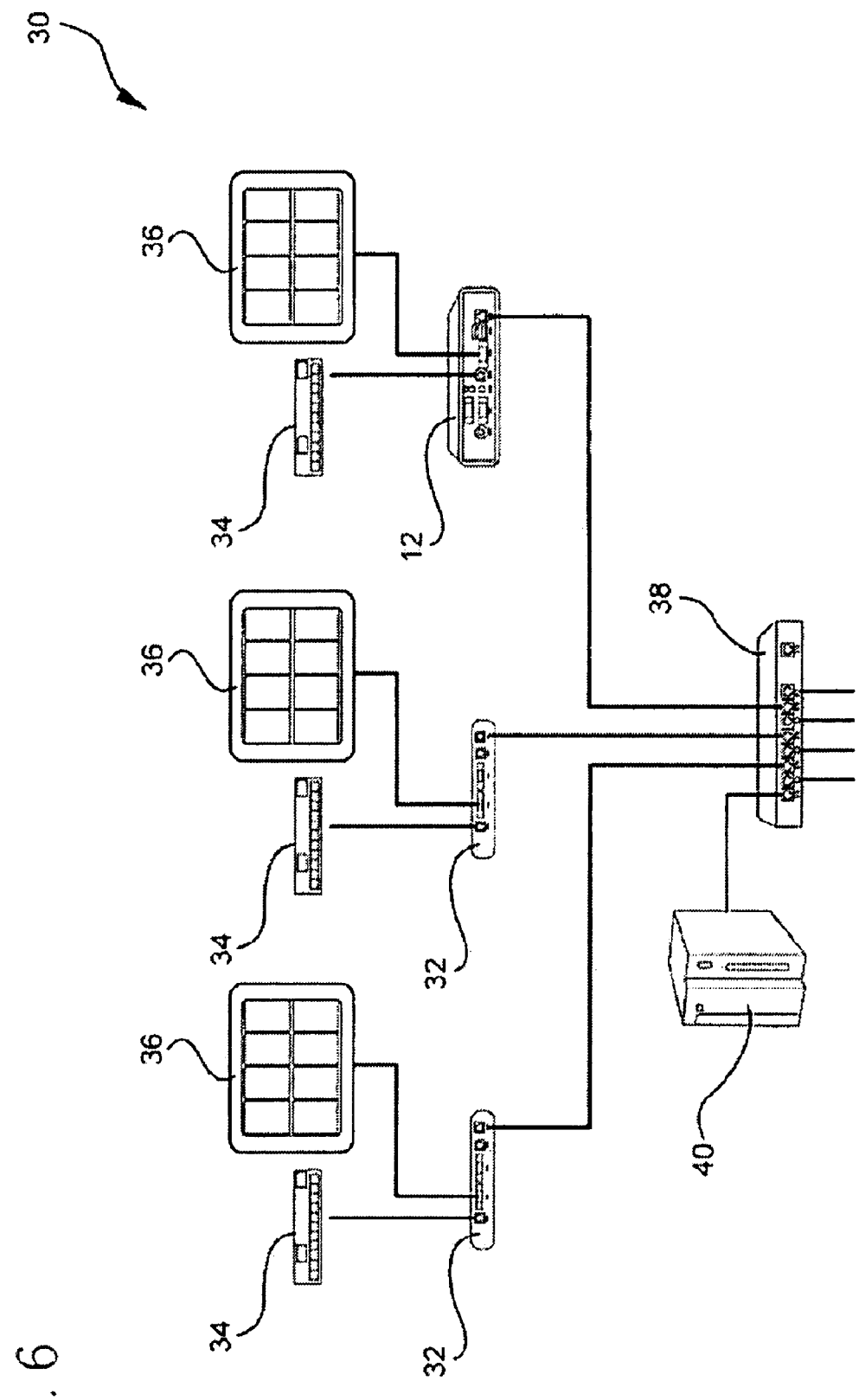
FIG. 6 is a block diagram of a hybrid networked computing system in accordance with the present invention.

FIG. 6 shows a hybrid networked computing system 54, which includes both industrial PC- and industrial non-PC-based workstations 12, 32 that are capable of interfacing to the same Ethernet hub 38. Thus, the hybrid networked computing system 54 provides multimedia and high-resolution video capabilities, which are advantageously used in video training of employees and personnel, while incorporating the advantages of the industrial non-PC-based workstations when needed with lower cost, higher reliability, and a reduction in size. In most practical applications, only workstations needed for video or other complex multimedia presentations are PC-based workstations, while the remaining workstations in the system need only be non-PC-based workstations.

The workstations 12, 32 preferably also include firmware build cards, which can be stored in an internal Compact-Flash® or any mass storage device, but preferably comprise a solid state memory device. Such a mass storage device is preferably removable from the workstations 12, 32 and capable of being reprogrammable, for example, by downloading information through the Ethernet and/or RS-232 interfaces.

CompactFlash® (CF) cards are small, removable mass storage devices, which are well suited to the present invention, are well known in the art, weigh about a half ounce or less, and are typically the size of a matchbook. Compact-Flash® can provide complete PCMCIA-ATA functionality and compatibility.

The build cards preferably store recipes, videos, and/or programs tailored to each user's needs. For example, the build cards could enable an employee in a restaurant to learn how to prepare a particular food product without requiring personal training by more experienced employees. The workstations 12, 32 are preferably able to store a plurality of build cards or so-called "decks" of build cards.

Controllers 24, 32 preferably contain simple circuitry, which results in improved reliability and lowered cost. The hybrid system 30 shown in FIG. 6 in accordance with the present invention combines two or more types of controllers in the same KDS in such a way that the system essentially satisfies each of features 1 through 10 listed above. The hybrid system 30 is made possible by designing an industrial non-PC based controller 32 having an Ethernet interface. FIG. 6 shows that the hybrid system 30 also includes an industrial PC-based controller 12 that is preferably used to show training videos and other multimedia applications while the remaining workstations utilize more reliable and lower cost industrial non-PC-based controllers 32.

In another embodiment of the present invention, industrial PC-based controllers 11, 12 present in the system and shown in FIG. 1 have differing capabilities and/or performance characteristics. Thus, an industrial non-PC-based controller 32 in the hybrid networked system shown in FIG. 3 may be replaced with a lower performance industrial PC-based controller 11 shown in FIG. 1 when an incremental improvement in performance and/or capability is required in a particular application.

The Ethernet networks used in the present invention may incorporate so-called "home run" or "star" Ethernet topology, which is shown in FIGS. 1, 3, and 6 while remaining within the scope of the present invention. In this topology, the workstations are wired directly back to the Ethernet hub. The controllers 11, 12, 32 may further be adapted to be TCP/IP addressable while remaining within the scope of the present invention.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A Kitchen Display System (KDS), which comprises:
  a workstation comprising a first Personal Computer (PC)-based controller, the first PC-based controller storing and displaying at least one of video and multimedia, the first PC-based controller running an operating system, the first PC-based controller comprising a fan;
  a plurality of fanless workstations,
  each of the plurality of fanless workstations being smaller in size than the workstation comprising the PC-based controller and comprising a non-PC-based controller having a lower purchase cost and lower performance than the first PC-based controller, an Ethernet interface controller, a video graphics array (VGA) port, a keyboard port, and a peripheral device connector, each of the fanless workstations being incapable of running an operating system, and being without multimedia capability, a hard drive, a user interface, and any moving mechanical parts;
  a PC-based server having software applications for use by the workstation and the plurality of fanless workstations;
  an Ethernet network operatively coupling the workstation, the plurality of fanless workstations, and the server; and
  at least one of a bump bar, keyboard, touchscreen, and keypad operatively coupled to at least one of the PC-based and non-PC based controllers.

2. The Kitchen Display System (KDS) defined by claim 1, further comprising at least one of a cathode ray tube monitor, liquid crystal display monitor, touchscreen, and printer operatively coupled to at least one of the PC-based and non-PC based controllers.

3. The Kitchen Display System (KDS) defined by claim 1, wherein the lower purchase cost controller comprises a microcontroller.

4. The Kitchen Display System (KDS) defined by claim 1, wherein the KDS is networked with a Point-of-Sale (POS) networked computing system.

5. A Kitchen Display System (KDS), which comprises:
  a workstation comprising a first Personal Computer (PC)-based controller, the first PC-based controller running an operating system, the first PC-based controller comprising a fan;
  a plurality of fanless workstations,
  each of the plurality of fanless workstations being smaller in size than the workstation comprising the PC-based controller and comprising a non-PC-based controller having a lower purchase cost and lower performance than the first PC-based controller, an Ethernet interface controller, a video graphics array (VGA) port, a keyboard port, and a peripheral device connector, each of the fanless workstations being incapable of running an operating system, and being without multimedia capability, a hard drive, a user interface, and any moving mechanical parts;
  a PC-based server having software applications for use by the workstation and the plurality of fanless workstations; and
  an Ethernet network operatively coupling the workstation, the fanless plurality of workstations, and the server.

6. The Kitchen Display System (KDS) defined by claim 5, wherein the PC-based controller stores and displays at least one of video and multimedia.

7. The Kitchen Display System (KDS) defined by claim 5, wherein the lower purchase cost controller comprises a microcontroller.

8. The Kitchen Display System (KDS) defined by claim 5, wherein at least one of the PC-based and non-PC based controllers is operatively coupled to at least one of a bump bar, keypad, keyboard, touchscreen, and printer.

9. The Kitchen Display System (KDS) defined by claim 5, wherein at least one of the PC-based and non-PC based controllers is operatively coupled to at least one of a cathode ray tube monitor, liquid crystal display monitor, touchscreen monitor, and printer.

10. The Kitchen Display System (KDS) defined by claim 5, wherein the KDS is networked with a Point-of-Sale (POS) networked computing system.

11. A Point-of-Sale (POS) networked computing system, which comprises:
  a workstation comprising a first Personal Computer (PC)-based controller, the first PC-based controller running an operating system, the first PC-based controller comprising a fan;
  a plurality of fanless workstations,
  each of the plurality of fanless workstations being smaller in size than the workstation comprising the PC-based controller and comprising a non-PC-based controller having a lower purchase cost and lower performance than the first PC-based controller, an Ethernet interface controller, a video graphics array (VGA) port, a keyboard port, and a peripheral device connector, each of the fanless workstations being incapable of running an operating system, and being without multimedia capability, a hard drive, a user interface, and any moving mechanical parts;

a PC-based server having software applications for use by the workstation and the plurality of fanless workstations; and an Ethernet network operatively coupling the workstation, the plurality of fanless workstations, and the server.

12. The Point-of-Sale (POS) networked computing system defined by claim 11, wherein the PC-based controller stores and displays at least one of video and multimedia.

13. The Point-of-Sale (POS) networked computing system defined by claim 11, wherein the lower purchase cost controller comprises a microcontroller.

14. The Point-of-Sale (POS) networked computing system) defined by claim 11, wherein at least one of the PC-based and non-PC based controllers is operatively coupled to at least one of a keypad, keyboard, touchscreen, and printer.

15. The Point-of-Sale (POS) networked computing system defined by claim 11, wherein at least one of the controllers is operatively coupled to at least one of a cathode ray tube monitor, liquid crystal display monitor, touchscreen monitor, and printer.

16. The Point-of-Sale (POS) networked computing system defined by claim 11, wherein the POS networked computing system is networked with a Kitchen Display System (KDS).

* * * * *